G. A. LOWRY.
SHREDDING AND SPINNING MACHINE.
APPLICATION FILED NOV. 7, 1914.
1,309,646.
Patented July 15, 1919.
10 SHEETS—SHEET 1.
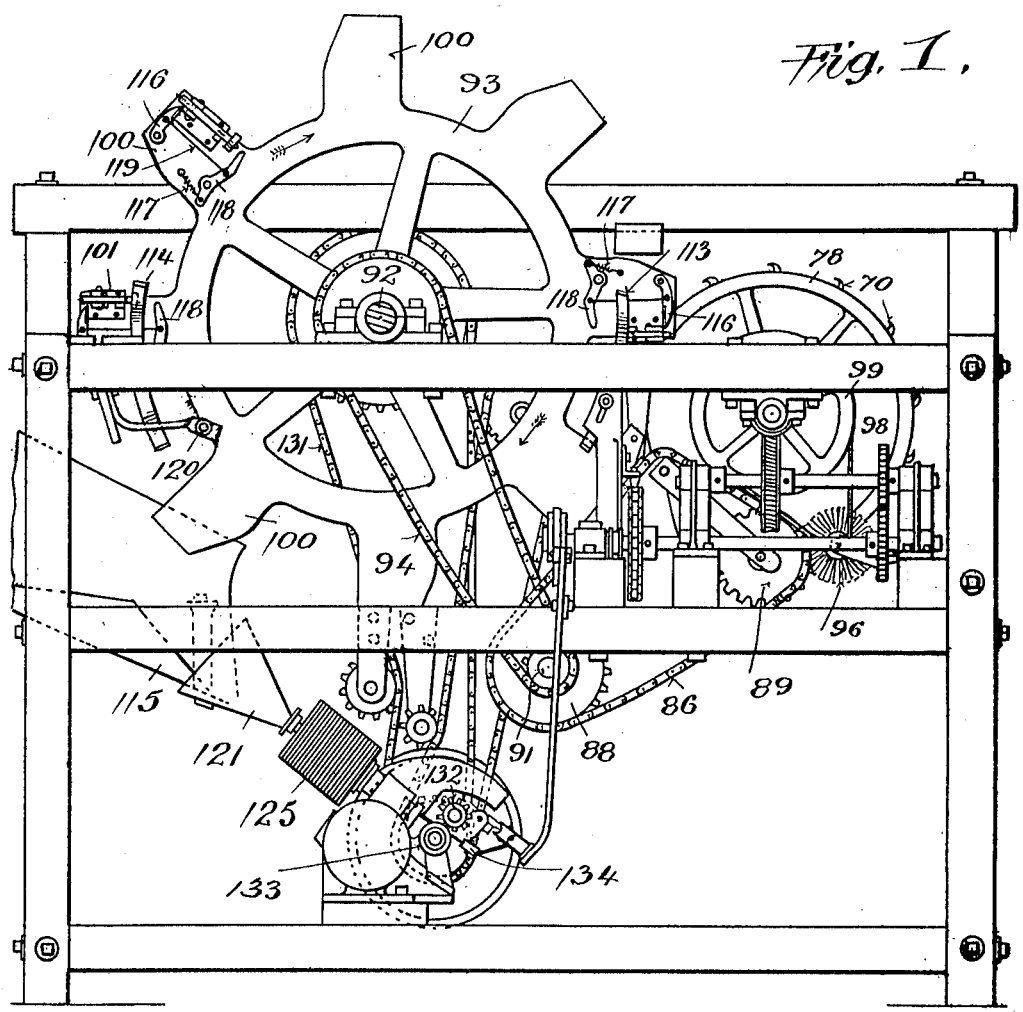
Fig. 1.
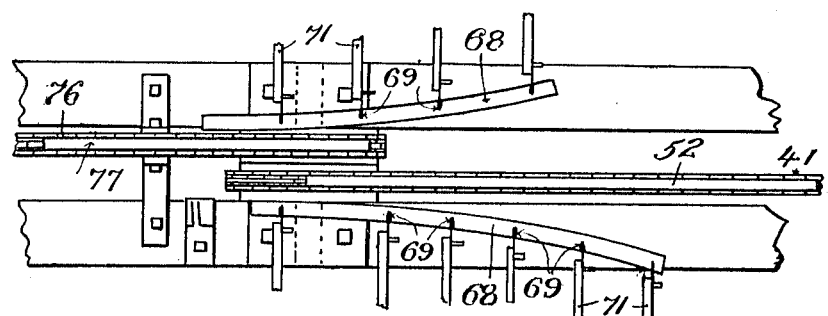
Fig. 11ᵃ
Witnesses:
Inventor
George A. Lowry
By his Attorney

G. A. LOWRY.
SHREDDING AND SPINNING MACHINE.
APPLICATION FILED NOV. 7, 1914.

1,309,646.

Patented July 15, 1919.
10 SHEETS—SHEET 2.

Witnesses:
Inventor
George A. Lowry
By his Attorney
Samuel E. Darby

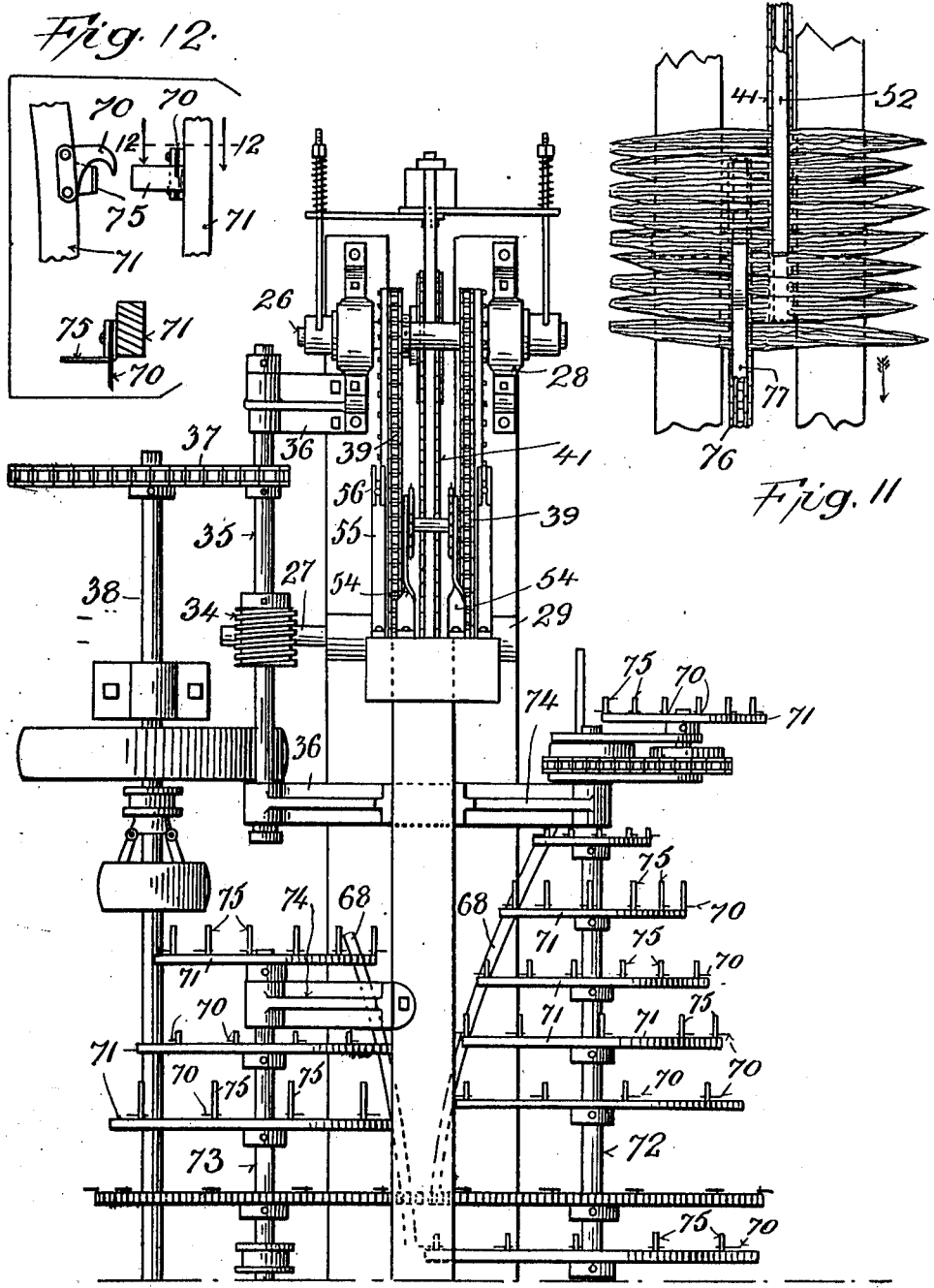

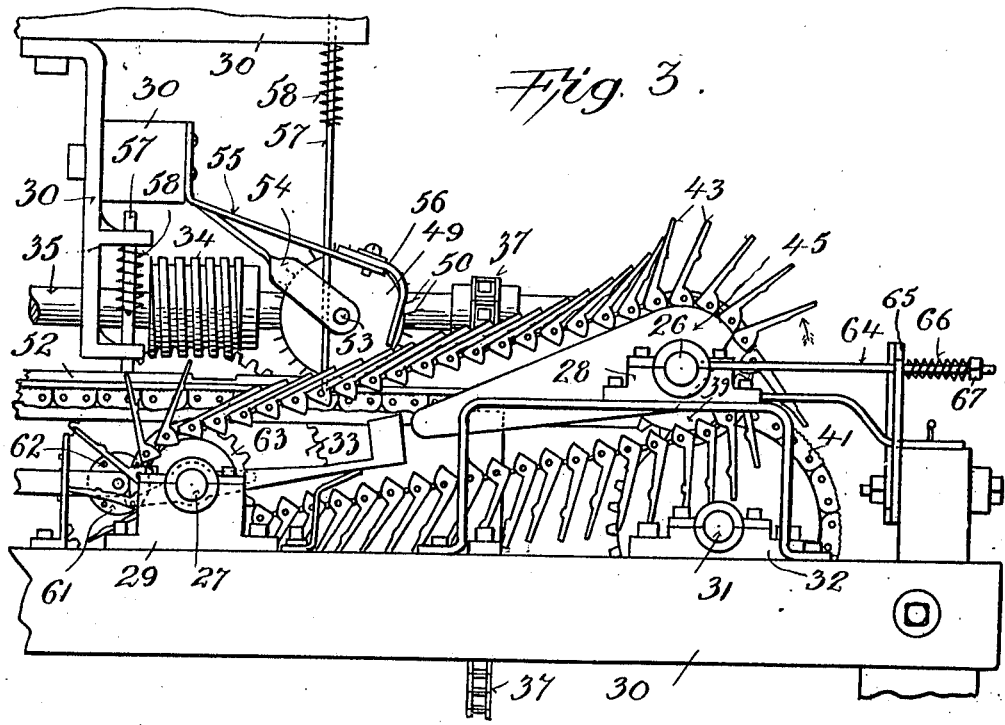
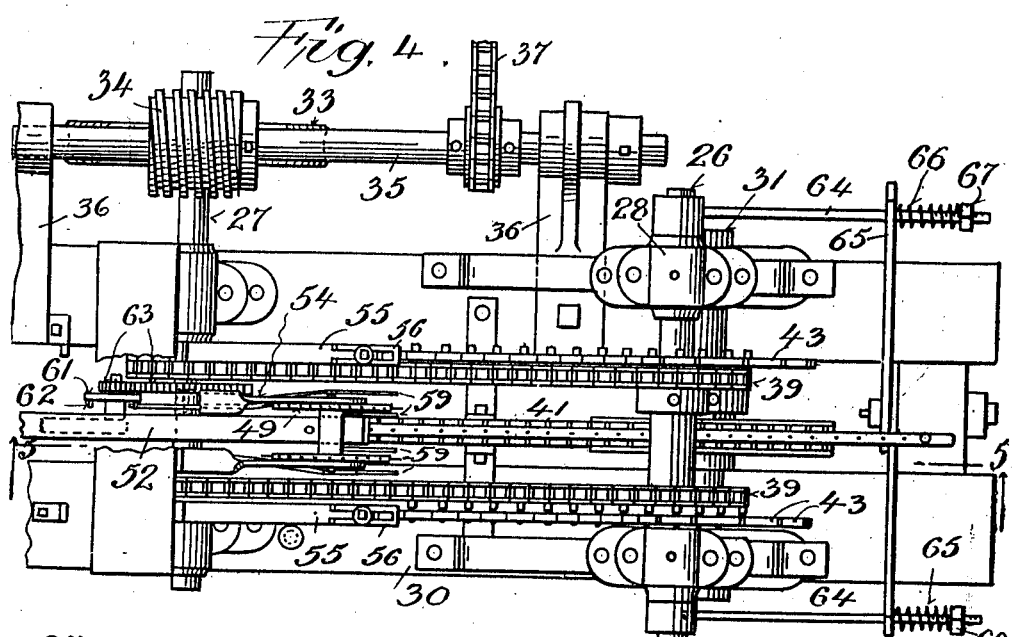

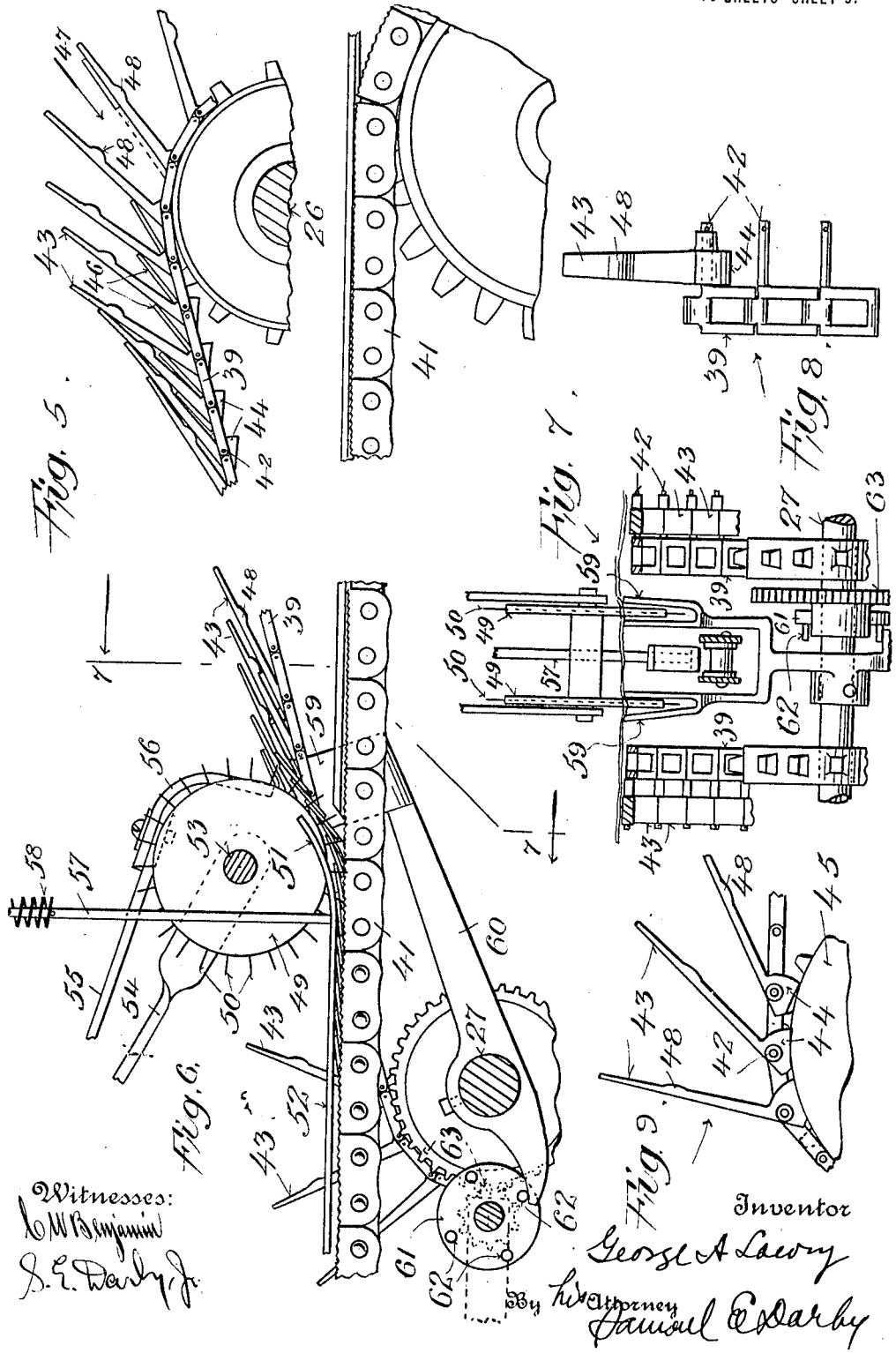

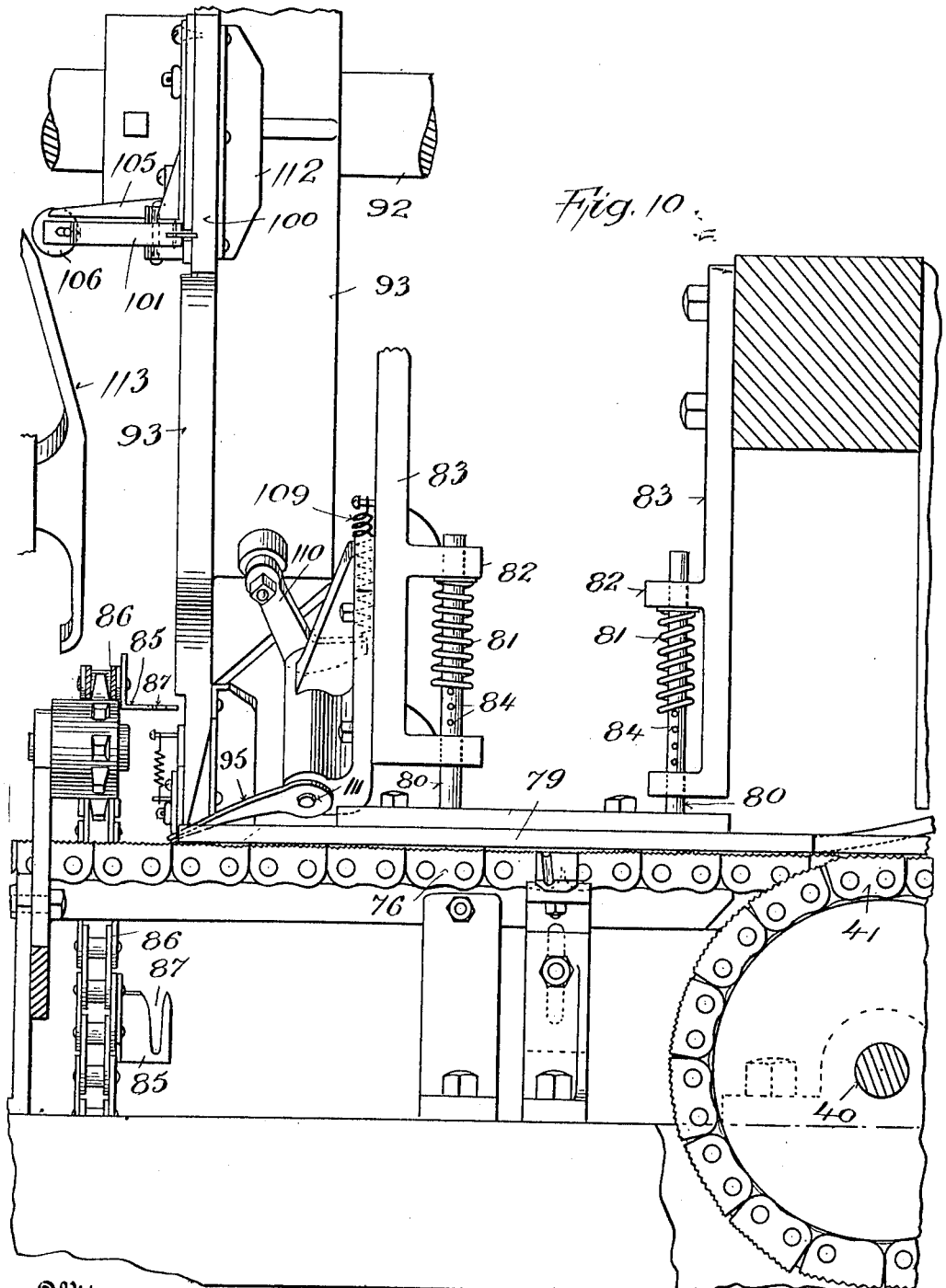

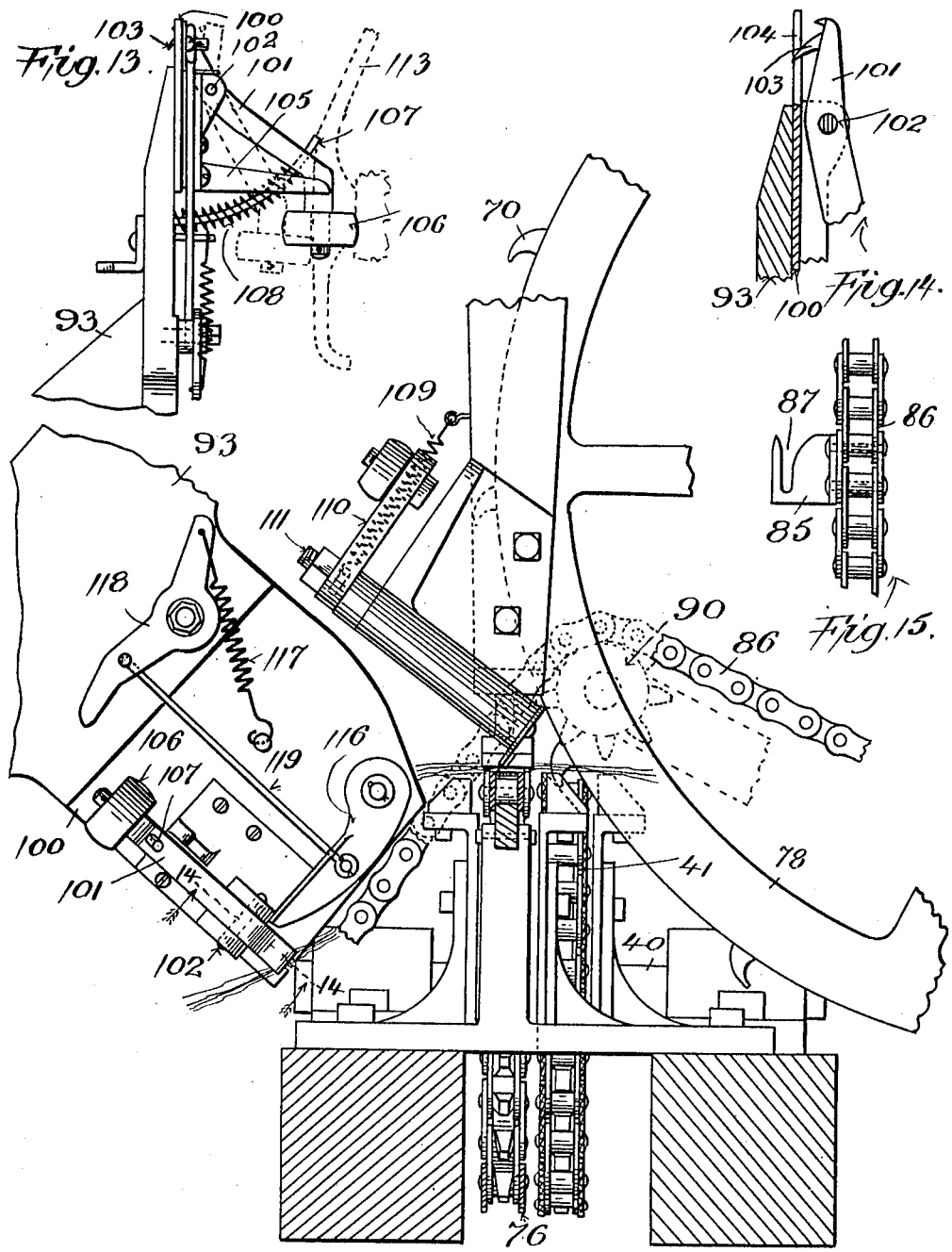

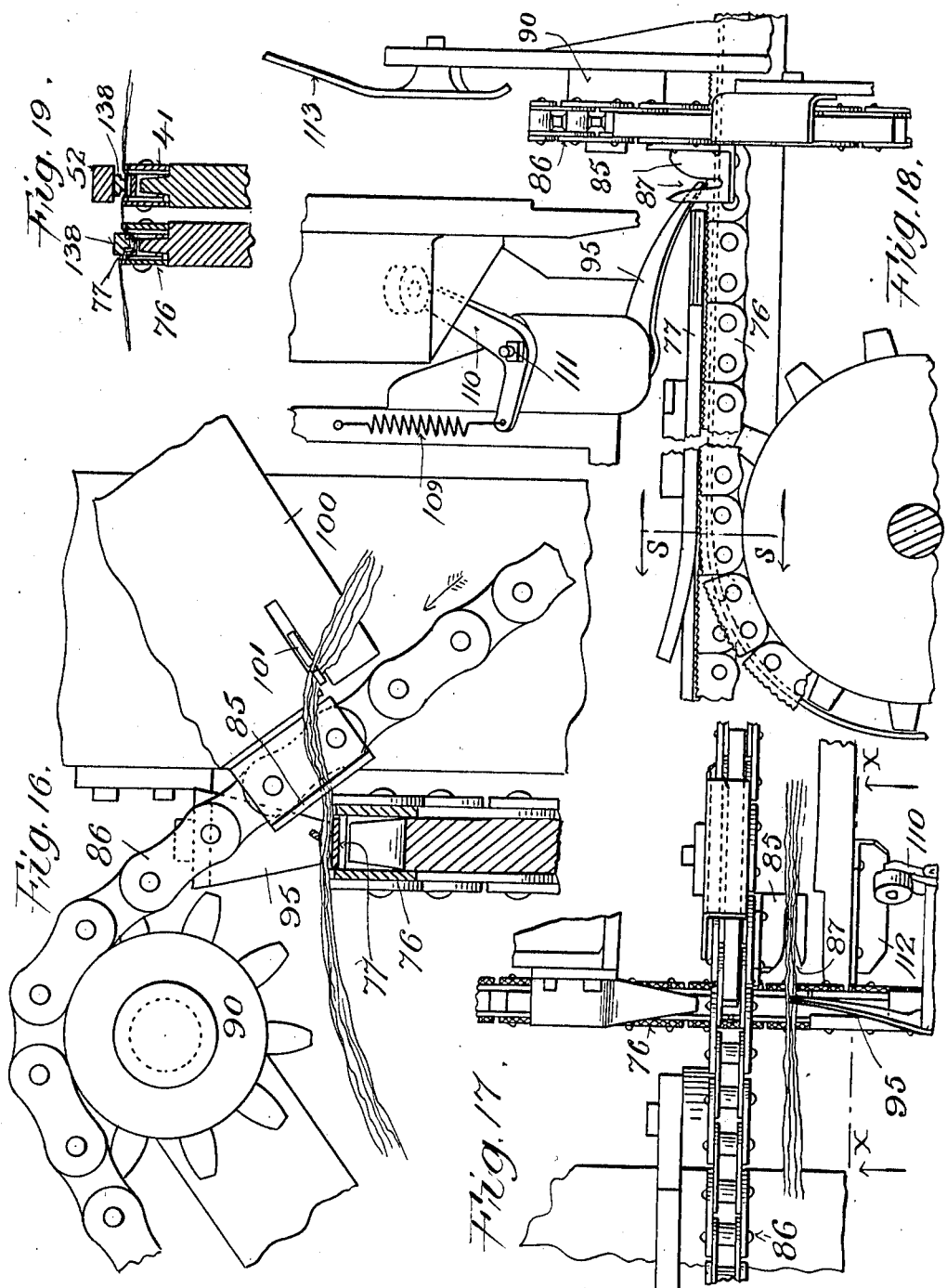

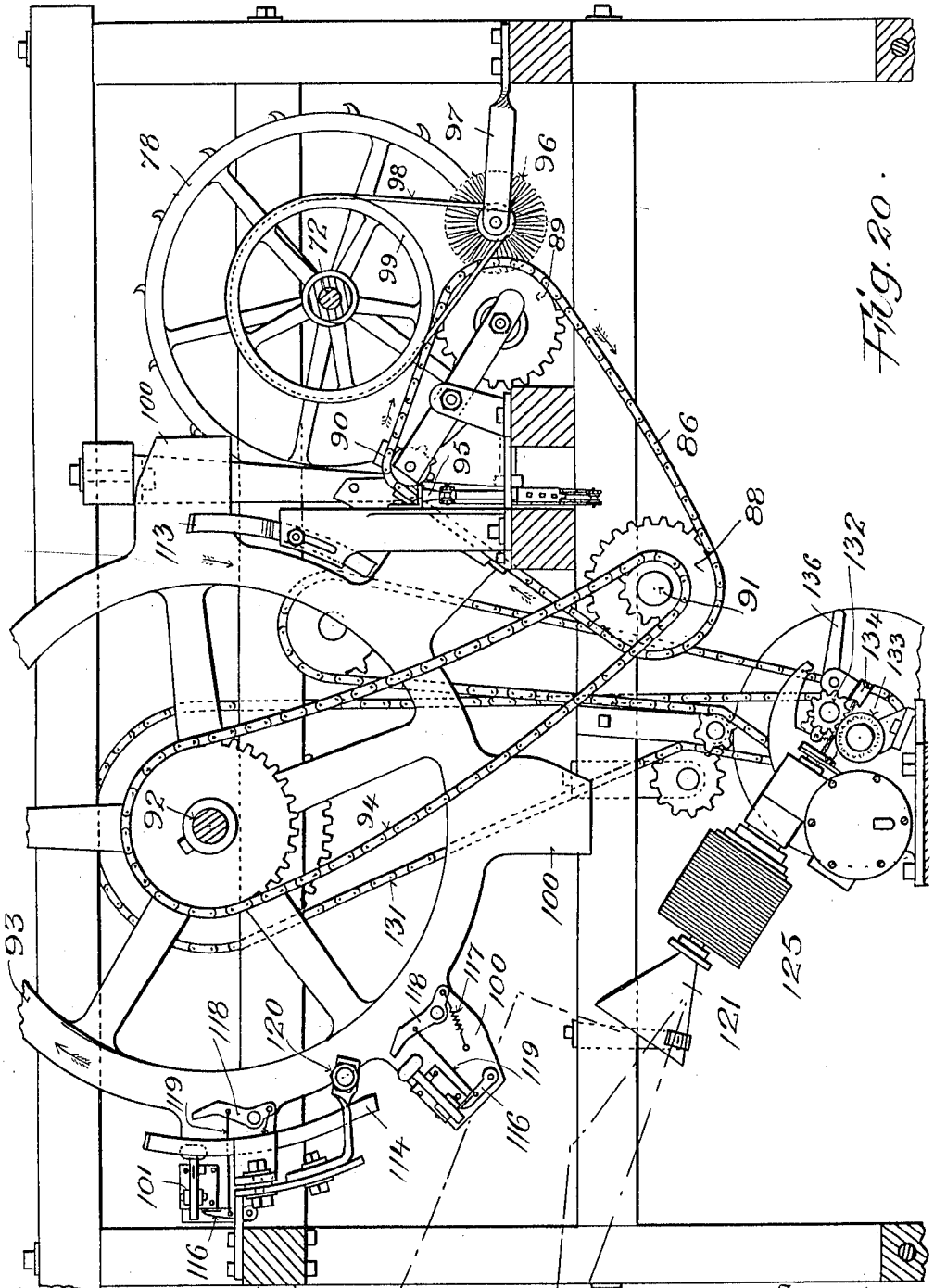

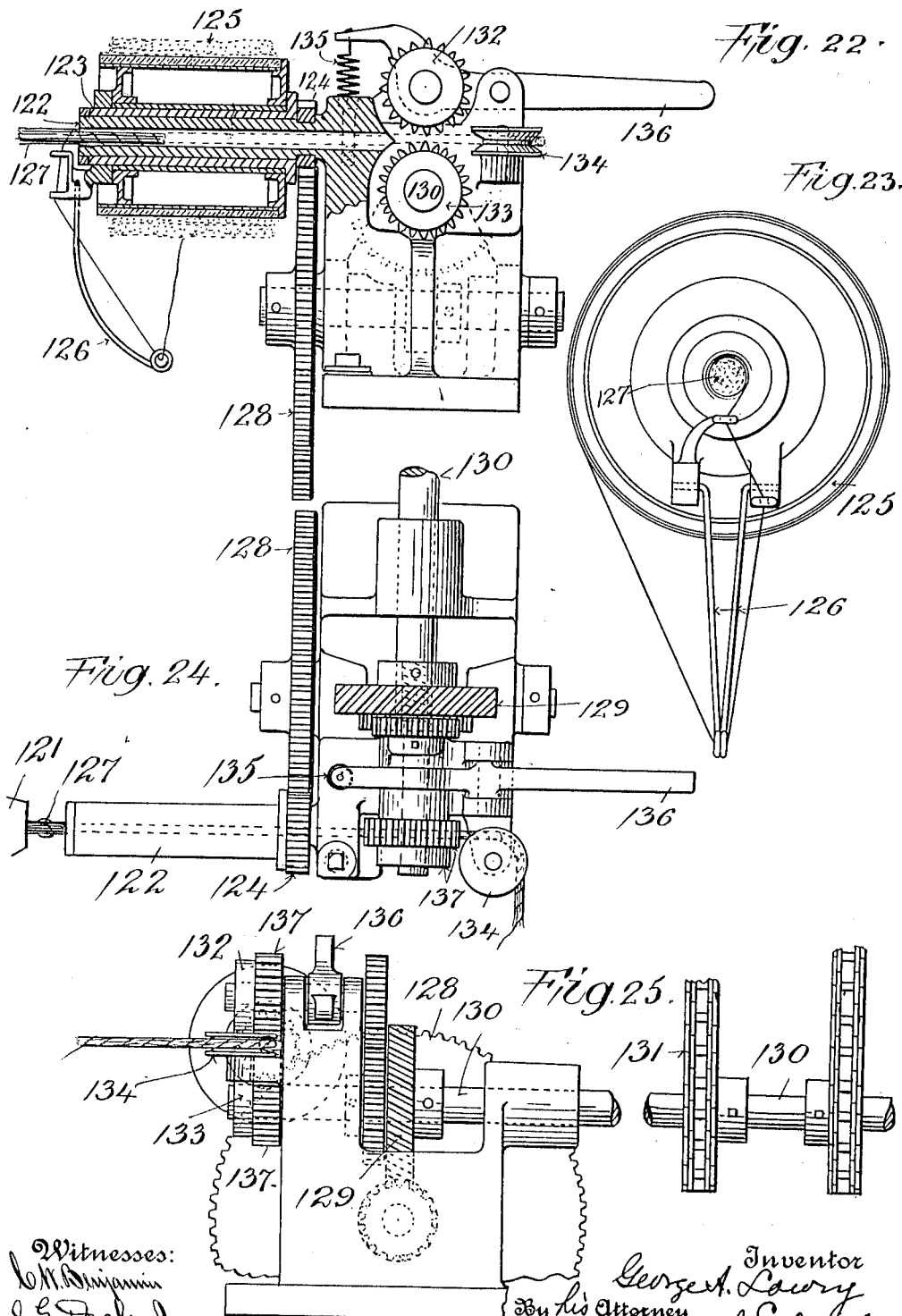

UNITED STATES PATENT OFFICE.

GEORGE A. LOWRY, OF NEW YORK, N. Y., ASSIGNOR, BY MESNE ASSIGNMENTS, TO A. BLAIR RIDINGTON.

SHREDDING AND SPINNING MACHINE.

1,309,646.             Specification of Letters Patent.      Patented July 15, 1919.

Application filed November 7, 1914. Serial No. 870,766.

*To all whom it may concern:*

Be it known that I, GEORGE A. LOWRY, a citizen of the United States, residing in the city, county, and State of New York, have made a certain new and useful Invention in Shredding and Spinning Machines, of which the following is a specification.

This invention relates to machines for shredding palmetto or palm leaves or other material and spinning the same into twine.

The object of the invention is to provide a machine which is simple in construction and efficient in operation for shredding palmetto or palm leaves and the like and spinning the shredded product into twine.

The invention consists substantially in the construction, combination, location and relative arrangement of parts, all as will be more fully hereinafter set forth, as shown in the accompanying drawings, and finally pointed out in the appended claims.

Referring to the accompanying drawings:—

Figure 1 is a view in elevation of the rear end of a shredding and spinning machine embodying the principles of my invention.

Figure 2:
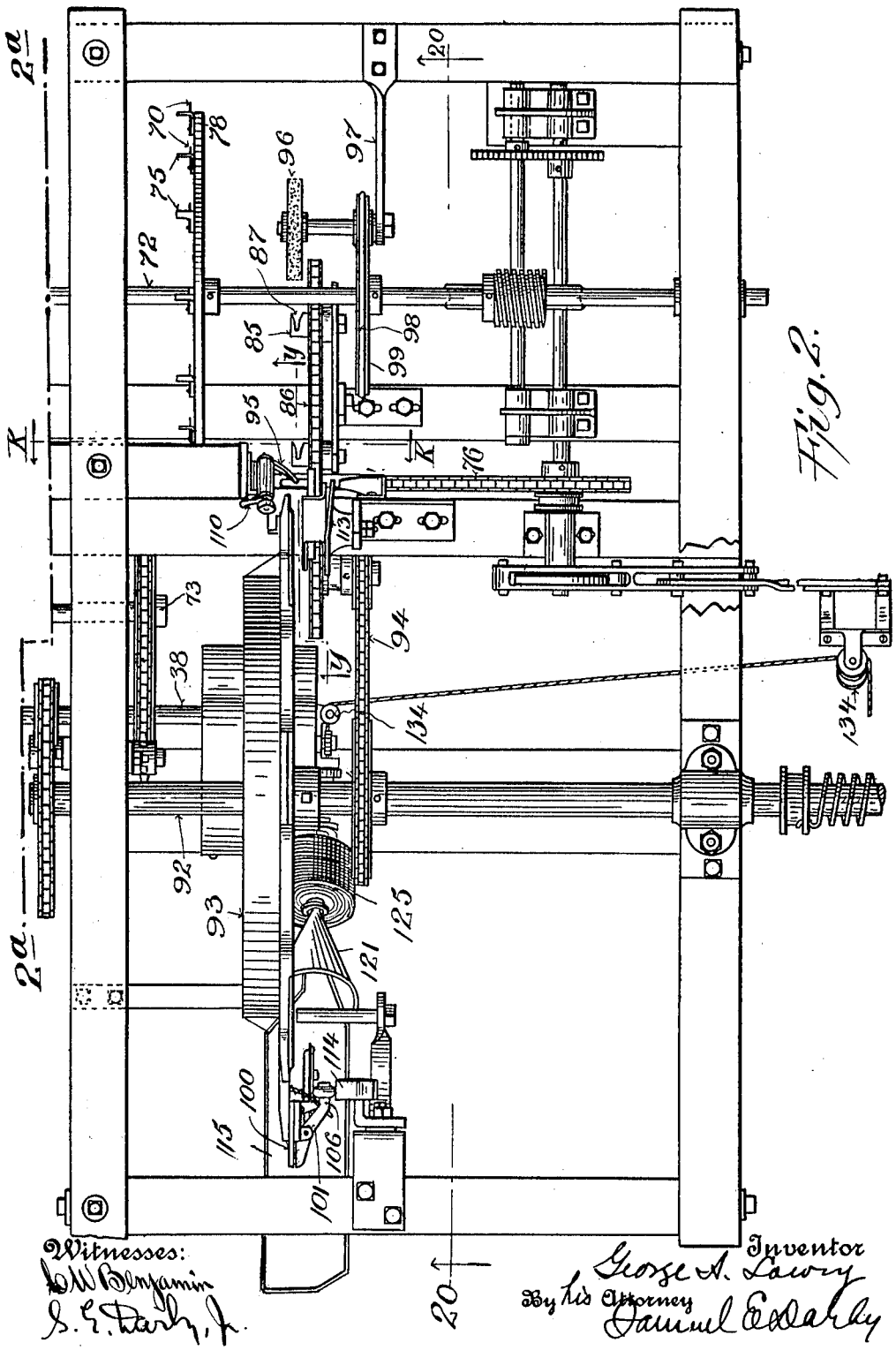
Fig. 2 is a top plan view of that portion of the machine shown in Fig. 1.

Fig. 2ª is a top plan view of the feed in end of the machine showing the shredding mechanism.

Fig. 3 is a broken view in side elevation showing the mechanism for feeding in the palmetto or palm leaves to the shredding device.

Fig. 4 is a broken view in top plan of the construction shown in Fig. 3.

Fig. 5 is an enlarged broken fragmentary detail view in vertical section on the line 5, 5, Fig. 4, showing the position of the feeding fingers as they receive the leaves.

Fig. 6 is a broken detail view in vertical section on the line 5, 5, Fig. 4 showing the magazine wheel for transferring the palmetto leaves from the feed fingers to the feed chain.

Fig. 7 is a broken view in vertical section on the line 7, 7, Fig. 6.

Fig. 8 is a detached detail view showing a feeding finger and its carrying link.

Fig. 9 is a broken detail view showing the manner in which the feeding fingers are brought into position to receive the palmetto leaves.

Fig. 10 is a broken view in vertical section on the line K—K Fig. 2, looking in the direction of the arrows.

Fig. 11 is a broken view in plan showing the arrangement at the point of transfer of the leaves from one to another feed chain or carrier.

Fig. 11ª is a view similar to Fig. 11 showing the relation of the leaf supporting rails and shredding devices.

Fig. 12 shows details in elevation, top plan and section on the line 12, 12, of the cutting or shredding blades.

Fig. 13, is a broken view in plan showing a construction of gripper device.

Fig. 14 is a broken detail view in section on the line 14, 14, Fig. 21.

Fig. 15 is a detached broken detail view showing means for dividing the strands or shreds of the leaves preparatory to the action of the grippers.

Fig. 16, is a broken view in vertical section on the line $x$, $x$, Fig. 17, showing the divider and nipper operating on the strands or shreds.

Fig. 17, is a top plan view of the construction shown in Fig. 16.

Fig. 18, is a broken view in side elevation of the same.

Fig. 19, is a broken detail view in section on the line S—S of Fig. 18.

Fig. 20, is a broken view in vertical section on the line 20, 20, Fig. 2.

Fig. 21, is an enlarged broken detail section on the line Y Y Fig. 2.

Fig. 22, is a view in vertical central longitudinal section through a form of thread wrapping mechanism embodying my invention.

Fig. 23 is a front end view of the construction shown in Fig. 22.

Fig. 24, is a view in top plan of the same.

Fig. 25, is a broken view in rear end elevation of the same showing the driving mechanism for the wrapping mechanism and draw head.

The same part is designated by the same reference numerals, wherever it occurs throughout the several views.

I have found that the leaves of the palmetto and palm which grow abundantly in Florida and in other tropical localities, are capable of being shredded or cut into fibers or strands, which are strong and easily capable of being spun into twine which may be used in various ways, such, for instance, as binder twine or the like, or for weaving into carpets, rugs, matting, bagging or the like. These leaves grow in all seasons of the year, and their availability and great abundance makes it attractive as a business proposition to produce a machine by which such shredding and spinning may be accomplished rapidly, effectively and economically.

The sections of the leaves are ordinarily long flat and narrow with a central stem or backbone, and in preparing and presenting them for the action of the shredding devices in accordance with my invention, they are individually separated from each other and from the trunk of the plant, and are fed by suitable clamping and conveying devices laterally while individually maintained in flat condition. The shredding knives operate upon the leaves, so held and carried, in the direction of the length of the leaf sections succeeding shredding knives acting thereon to successively slit the leaf section longitudinally in successive stages of its length. The clamping parts of the conveying devices engage the leaves at approximately their mid-length, and I arrange shredding devices so that both ends of the leaf may be shredded. In order to complete the shredding operation throughout the entire length of the leaves, I provide means for transferring the feed of the leaves from one set of conveying devices to another set located along side of the same, thereby enabling the shredding knives to reach those portions of the leaves which were previously held by the initial conveying devices.

The shredding operation is accomplished while the leaves are held and carried along, as described, and after the completion of the shredding operation the fiber is presented to the action of clamp devices carried upon a revolving carrier, and is grasped or seized by such clamp devices in suitable and regulable quantities and drawn endwise from the mass and is delivered from said clamp devices to a spinning head in successive portions where they are formed into a twine and wrapped and the finished twine product is delivered from the spinning head by the action of a draw head.

This, generally, is a brief outline of the machine embodying the principles of my present invention, the details of the construction of which will now be pointed out.

At the feed in end of the machine are journaled short transversely extending shafts 26, 27, 31 in boxes 28, 29, 32, mounted upon a suitable part of the framework 30, which supports the various working parts of the machine. The shafts 26 and 31, are nearest to the extreme end of the framework and the shaft 26 is located at a higher elevation than the shaft 31, while the shaft 27 is located at a distance toward the rear end of the machine and at a lower elevation than that of shaft 26. Rotation is imparted to shaft 27 from any convenient source. A simple arrangement is shown wherein a gear 33 on said shaft is engaged and driven by a worm 34, on a shaft 35, and receiving power through a sprocket chain 37, from a main drive shaft 38. It is obvious that other arrangements for driving said shaft 27, or either or both of the other shafts 26, 31, might readily be employed. Over sprockets respectively carried by the shafts 26, 27, operate sprocket chains 39, and similarly, over sprockets respectively carried by shaft 31, and a coöperating shaft 40, a feed chain 41, operates, the said chain being positioned between and operating in a plane parallel to that of the sprocket chains 39. By reason of the elevation of the shaft 26 above shaft 31, it will be seen that the upper legs or runs of chains 39, are inclined relative to the chain 41, the upper leg or run of which operates in a horizontal plane. In fact, and as clearly shown in Fig. 3, the relative elevations of shafts 26 and 27 are such that the vertical planes in which the upper legs or runs of chains 39, operates, intersect the horizontal plane in which the upper leg or run of chain 41 operates, for a purpose presently to be more fully described.

Upon fingers or studs 42, extending laterally from the links of chains 39, see Fig. 8, are pivotally mounted clamp fingers 43. These fingers are provided with enlarged bases 44, which, in the travel of the chains around the sprockets on shaft 26, engage a stationary cam surface 45, which causes the fingers on each chain to be held in inclined position in the same vertical plane and spaced apart from each other a sufficient distance, see Figs. 5 and 9, to receive the individual leaves 46 therebetween. The leaves are placed by hand transversely between adjacent fingers of the chains and they rest upon the upper or advancing surfaces of corresponding fingers of the pair of chains 39, as indicated at 47, in Fig. 5. As the fingers 43 leave the cam surface 45, they fold rearwardly upon themselves by gravity thereby clamping and holding the leaves in position as they carry said leaves along and downwardly toward the feed chain 41. It will be observed that each leaf is held at two points in its length, and in flattened condition, and in laterally tilted position, between the flat surfaces of adjacent fingers. This insures that the leaves are properly held and introduced in uniform condition to the carriers which receive and carry them past the shredding devices. The fingers are provided on their rear surface with enlargements 48, which serve to space adjacent fingers a sufficient distance apart to prevent the leaves from being clamped too tightly, and also serve to engage the leaves and exert a clamping action thereon. An operator can readily and rapidly introduce the leaves individually by placing the same on the upper surfaces of the fingers 43, as they begin to rise above the horizontal in passing around the sprocket on shaft 26. By the downwardly and forwardly inclined line of travel of the chains 39, the leaves are carried laterally toward and into position to be received by the horizontally moving feed chain 41. In order to effect an efficient transfer of the leaves from the initial feeding fingers 43, to the chain 41, and to withdraw the leaves from the fingers without danger of disturbing their relative positions by shifting them laterally, or out of their flatwise condition, I provide a suitable transfer mechanism, which in the embodiment shown, see Figs. 4 and 6, includes wheels 49, having pins 50, projecting radially from the periphery thereof and into position to impale the leaves at points on opposite sides of the feed chain 41, and closely adjacent thereto as the leaves approach said chain. The continued advance of the chains 39, downwardly past the horizontal plane of travel of the feed chain 41, causes the leaves to be drawn from between the pairs of fingers 43, and to be carried underneath the upturned end 51, of a presser bar or shoe 52 which is carried immediately above and parallel to the feed chain 41, and between which and said chains the leaves are carried by the latter past the shredding devices. The pin wheels 49, are carried upon a shaft 53, carried in arms 54, which are attached to a convenient part of the framework 30. In order to insure the fingers 43 occupying uniform positions as they approach the point where the pin wheels operate, a guide arm 55, is attached to a fixed part of the framework and extends downwardly into position over the path of each series of fingers 43, to fold or depress each finger that might be raised or displaced backwardly down on the next adjacent rearmost finger, as clearly indicated in Fig. 3. The end 56 of guide arm 55, which engages the fingers, may be made adjustable, as shown. The shoe 52 is yieldingly pressed downwardly toward the feed chain 41, to efficiently clamp and hold the leaves thereto. A simple arrangement for accomplishing this is shown wherein said shoe is carried by vertical rods 57, which work loosely through suitable parts 30 of the framework. Springs 58 serve to yieldingly press the rods 57 downwardly. See Fig. 3. In order to insure the impaling of the leaves upon the pins 50, I provide a presser foot 59 arranged to fork over or straddle the periphery of each pin wheel 49, to engage the leaves on opposite sides of the wheels and press them upwardly onto the impaling pins, as clearly shown in Fig. 7. This presser foot is carried at one end of a pivotally mounted lever 60, the other end of said lever being engaged and rocked periodically. A simple arrangement is shown wherein a wheel 61 is provided with pins 62 in the face thereof, which, when said wheel is rotated, successively engage the end of lever 60, thereby rocking it. The wheel 61 is driven through gears 63 from the shaft 27, see Figs. 4 and 6.

By the action of the transfer mechanism just described the leaves are detached from the carrying fingers and are introduced beneath the shoe 52 and in suitable and proper order, spatial relation and position to be engaged thereby and carried forwardly past the shredding devices.

The tension under which the chains 39 operate may be regulated in any suitable or convenient manner. As illustrative of the principles involved I have shown in Figs. 3 and 4 a simple arrangement wherein the bushings or bearings in which the shaft 26 is journaled have rods 64, connected thereto which extend forwardly toward the front or feed-in end of the machine, and pass loosely through suitable supports 65. Springs 66, interposed between the supports 65 and nuts 67 on the ends of rods 64 exert an adjustable yielding tension upon said rods which is imposed on the chains 39 through the shaft 26.

From the transfer mechanism, above described, the leaves are engaged by the feed chain 41, being held down upon said feed chain by the presser bar or shoe 52, and being carried forwardly past the shredding devices by means of which the leaves are slitted longitudinally into fiber or shred form.

As the leaves are held by the shoe 52 and chain 41 at approximately their mid-length point, they are carried forwardly while occupying a position at right angles to their line of feed, with their ends projecting on respectively opposite sides of the feed chain. I therefore locate shredding devices on opposite sides of the line of feed of the leaves and in such relation as to act upon the leaves in successive portions of the length thereof, thereby enabling the shredding operation to be accomplished effectively by knives or cutters moving in planes intersecting at right angles the line of feed of the leaves and exerting their cutting action in the direction of the length of the leaves, and without interrupting the continuous feed of the leaves, and without causing the leaves to be torn by the shredding knives. As the leaves are fed past the shredding knives, or the planes of action thereof, it is desirable that their ends be held flat, particularly at the points of action of the shredding cutters. To accomplish this I provide the bars 68 upon which the ends of the leaves rest and along which they are carried. These plates are preferably slitted on their outer edges, as indicated at 69, see Fig. 11ª, so that the shredding knives may pass therethrough, the bars 68 thus constituting ledger blades to support the portions of the leaves upon which the cutters act, and to take the pressure of the leaves during the slitting action. They also serve to support the leaves in flat condition.

The shredding devices are in the form of short cutting or slitting blades 70 see Fig. 2ª. These are carried at the peripheries of plates or disks 71, one set of which, on one side of the carrier chain 41, is mounted on shaft 72, and the other set is mounted on a shaft 73, on the opposite side of the feed chain. The shafts 72, 73, are arranged parallel to each other and to the line of feed of the feed chain. They are journaled in suitable brackets 74 of the framework, and are driven in any convenient manner. The shredding knives which first attack the ends of the leaves operate only upon the extreme ends thereof, while the successive shredders act on successive portions of the length of the leaves. Consequently the initial knife disk 71, is offset away from shaft 74, and the line of feed of the leaves, and is driven from shaft 72, as most clearly shown in Fig. 2ª, and the suceeding disk on shaft 72, as well as the initial disk on shaft 73, are of comparatively short diameters, the succeeding disks being of relatively increasing diameters, as clearly shown, the bars 68 being suitably curved toward each other in the direction of their length in correspondence with the increasing sizes of the cutter or knife disks.

In order to efficiently hold the leaves in flatwise condition down upon the bars 68, I provide the cutter wheels 71 with pins 75, which project laterally from the faces of said disks and are located in proximity to the knives 70. These pins engage the ends of the levers as they wipe by the edge of the bars 68, and press them down flat upon said bars during the time the cutters are passing through the leaves.

In order to permit the leaves to be shredded throughout their entire length it is necessary for the feeding grip thereon to be transferred from the feed chain 41 in order to enable that portion of the leaves which were covered by the chain and the shoe to be uncovered and to be accessible to the action of shredding cutters. To accomplish this I provide a second feed chain 76, and shoe 77, to which the leaves are transferred from the feed chain 41, as most clearly shown in Figs. 11 and 11ª. The second chain 76 receives the leaves at a point where they have already been shredded, and carries them past a final cutting disk 78, see Fig. 1, where the unshredded portion of the leaves is reached to complete the shredding operation throughout the entire length of the leaves.

In Fig. 12, I have shown details of the shredding knives, and the relation thereof to the fingers.

If desired the shoe 77 which coöperates with the second feed chain 76, may be yieldingly held to its work in any convenient manner. A simple arrangement is shown, see Fig. 10, wherein a plate 79, carried by rods 80, is acted upon by springs 81 coiled upon said rods and acting at one end against lugs 82 on fixed brackets 83, through which lugs the rods 80 loosely slide, and at their other ends upon pins 84, carried by said rods. The plate 79, is arranged to press downwardly upon the shoe 77. By adjusting the pins 84 to a greater or less height, the tension of the springs and consequently the degree of pressure on the shoe may be regulated.

After the leaves have been completely shredded throughout their entire length, the shredded fibers are next presented to the selector and gripping devices for transfer to the spinning head to be formed into twine. The selector devices include dividers 85, see Fig. 10, which operate in a vertical plane transverse to the line of feed of chain 76, and they consist, in one form of embodiment thereof which I have shown to illustrate my invention, but to which I do not desire to be limited or restricted, of angle plates carried by and extending laterally from a sprocket chain 86, and each having a notch 87, in the advancing edge thereof. The sprocket chain 86, operates over sprockets 88 and 89, and a deflecting guide 90 so as to cause the dividers 85 to travel in the proper direction to perform their function and to properly coöperate with the grippers. It is the special function of the dividers to pass upwardly through the mass of shredded fibers and engage or select a portion of desired quantity and elevate the same into suitable position to be engaged or grasped by the nippers of the gripping devices. The divider carrying chain may be operated in any convenient manner. I have shown a simple arrangement wherein the sprocket 88 is carried on a shaft 91, which is driven from the shaft 92 of the nipper wheel 93, through sprocket chain or other form of gearing 94. In this manner the proper coöperative timing of the apparatus is secured. In order to efficiently hold down the shredded fibers after they pass from beneath the shoe 77, and while they are being acted upon by the dividers, I provide a presser finger 95, which is positioned over the line of feed of the fibers to extend beyond the end of shoe 77, and to a point where it engages upon the shredded fiber at the line of travel of the dividers, as most clearly shown in Fig. 18. The presser finger is yieldingly pressed to its work by tension afforded by spring 109, acting upon one arm of a bell crank lever 110, carried by the shaft 111 on which finger 95 is carried. The other arm of said bell crank lever is arranged in the path of a cam surface 112, see Fig. 10, on the nipper wheel 93, to be engaged thereby at the proper time and rocked so as to raise the finger out of the way and permit the strands or fibers grasped by the nipper devices to be withdrawn as the nipper wheel continues on its rotative movement. Thus it will be seen that the presser finger 95 acts to hold the fiber in proper position only while the dividers are doing their work, but as soon as the nippers come into action to grip the divided fibers the presser finger is released.

I propose to employ suitable devices for the purpose of removing from the dividers any loose strands or shreds of fiber which may be left by the nippers. A simple arrangement is shown for this purpose wherein a rotary brush 96 is arranged in or adjacent the path of the dividers after they have been passed by the point of action of the nippers, and which, operating against the dividers serve to keep them clean. The brush 96, is journaled in a bracket 97 extending from a convenient part of the framework, and it may be driven in any convenient manner. A belt 98 operating over a pulley 99 on the cutter shaft 72, will answer the desired purpose. See Fig. 20.

By the action of the dividers the desired quantity of the shredded fibers is selected, gathered up and separated from the mass of each divider, and presented in proper position to be received by a nipper on the nipper wheel. This action is clearly indicated in Figs. 16, 17, and 18.

The nipper wheel 93 revolves in the direction indicated by arrows in Fig. 20, and in a vertical plane transverse to the line of feed of the shredded fibers, and consequently in a plane parallel with the length of the shredded fiber. It carries a series of radial fingers 100 at its periphery which are spaced apart in definite relation with respect to the distance apart of the dividers 85, so that the nipper devices carried by the fingers 100 will be brought into proper position to receive and grasp a bunch of fibers which has been selected, divided from the mass and elevated by the dividers. The nipper devices mounted on the fingers 100, may be of any suitable construction capable of performing the desired function. I have shown a simple construction as an operative embodiment of my invention, wherein each nipper device includes a nipper dog 101, pivotally mounted as to 102, the gripping jaw carrying a tooth 103, which protrudes into a slot 104, see Figs. 12 and 14, in the face of the finger 100, so as to insure an efficient gripping action on the fibers when grasped by the nipper dog. The tail ends of the dogs carry rollers 106 and are guided in their rocking movements by the guide posts 105. Guide rods 107, curved concentric with the pivots 102, project through openings in the dogs and carry springs 108, which engage the tail ends of the dogs and serve to normally press the gripping jaws into efficient gripping action. As each nipper device approaches the line of feed of the fibers, and the point of action of the dividers, the cam surface 112 engages the arm 110 and rocks the presser finger 95 out of the way as hereinbefore described. At the same time the roller 106 engages a cam 113 adjustably mounted on the framework, and rocks the nipper dog 101 so as to open the jaw thereof to receive the selected bunch of fibers presented to the action thereof by a divider. As soon as the cams 112 and 113, are passed the presser finger 95 returns to its position in pressing engagement upon the fibers over the chain 76, while the nipper dog closes upon the selected bunch of fibers and draws the same longitudinally from the mass. The continued rotation of the wheel 93, eventually brings the roller 106 of the nipper dog, still carrying the grasped bunch of fibers, into engagement with a second adjustable cam 114, arranged in its path, thereby opening the jaw of the nipper to permit the release of the bunch of fiber carried thereby. The release cam 114, is so positioned relative to a receiving chute or pan 115, located below it, see Figs. 1 and 20, that when the fibers are released they drop into said chute from which they pass to the spinning head, presently to be described.

To insure that the shreds are disengaged from the nipper dogs when released, and in order to efficiently clear the jaws of fiber I associate a clearing device with each nipper the function of which is to wipe past the nipper jaw when it is opened to release the fiber and disengage the fibers or shreds therefrom. A simple and efficient arrangement for this purpose is shown wherein a wiper arm 116 is pivotally mounted upon each radial finger 100 of the nipper wheel 93, see Figs. 20 and 21. This arm is normally held in position alongside the nipper dog, by means of a spring 117, acting upon a lever 118 which is connected by a rod 119, to arm 116. When the nipper dog is opened to release the fiber grasped thereby the lever 118 comes in contact with a fixed stop 120 in its path, thereby rocking the same and through its connection with wiper arm 116, rocking the latter in a direction to wipe past the nipper jaw and clear the same of fiber.

By adjustably mounting the cams 112, 113, and 114, and the stop 120, the time of operation of the nipper dogs, the presser foot and the wiper may be regulated to suit the proper timing of the machine.

From the foregoing description it will be seen that the shreds or fibers are dropped in successive bunches into the chute or pan 115, and in successively overlapping relation. The chute is downwardly inclined and terminates in a funnel 121, through which the strands pass to the spinning head. This head may be of many specifically different forms. I have shown a simple arrangement wherein a stationary tubular member 122 is arranged in horizontal line with the delivery mouth of the funnel 121 see Figs. 22 and 24. Upon this member 122 is mounted a sleeve 123, having a drive pinion 124, connected thereto. A spool of wrapping material 125 is carried by sleeve 123 see Figs. 1 and 20. The wrapping material is led from the spool 125 through suitable tension means 126 to the bunch of fiber, indicated at 127, as the latter passes into the tubular member 122 as shown in Fig. 23. By imparting a rapid axial movement to the sleeve 123, and drawing the fiber product therethrough, not only are the fibers incorporated into twine form but it also has the wrapping material applied spirally therearound.

Rotation may be imparted to the spool carrying sleeve 123 in any convenient manner. A simple arrangement is shown wherein the pinion 124 is engaged by a drive gear 128, which receives rotation through worm gears 129, from a shaft 130, the latter receiving rotation from any convenient driving part of the machine, as, for instance, from the main shaft through chain 131.

The shreds or fibers are thus formed into twine and a wrapping is applied spirally thereto. From the spinning head the finished twine produce passes between the draw head rollers 132, 133, by which it is drawn through the spinning head and delivered past suitable guides 134, to a winding reel or otherwise. The rollers 132, 133, are yieldingly pressed together as by means of a spring 135, acting upon a lever 136, which carries one of said rollers, and by means of which said roller may be raised when necessary or desired. Rotation may be imparted to the draw rollers in any convenient manner. A simple arrangement is shown wherein the lowermost roller is carried by shaft 130, and intermeshing pinions 137 respectively mounted on said shaft and the shaft of the upper roller secures the desired rotations of said rollers.

I have found in practice that sometimes the knives which effect the shredding of the leaves fail to make a clean cut with the result that there is a tendency for the leaves to be drawn out from between the feed chain and its coöperating shoe. To prevent this I prefer to form the shoes 52, 77, with or to apply to the under side thereof ribs, as indicated at 138, Fig. 19, which fit down between the side links of the carriers and crimp the leaves over the upper edges of the links of the carriers, thereby efficiently gripping and holding the leaves and preventing them from being withdrawn endwise.

It is obvious that many other specific arrangements of details might well answer the purposes required, and therefore, while I have described a structure in all its details capable of carrying out the objects and purposes of my invention, as an illustrative and operative embodiment and the best form in which I contemplate carrying my invention into practical use, I do not desire to be limited or restricted to the exact details shown and described.

But what I claim as new and useful and of my own invention, and desire to secure by Letters Patent, is,—

1. In a shredding machine preparatory to spinning, and in combination with shredding devices, and a carrier for the leaves to be shredded, said carrier operating in a horizontal path, of means, constructed to receive and hold the leaves individually and operating in a path inclined to that of the carrier and side by side in the same direction therewith, to convey and deliver the leaves in successive order to said carrier.

2. In a shredding machine preparatory to spinning, and in combination with shredding devices, and a carrier for the leaves to be shredded, of feeding chains positioned on opposite sides of said carrier and operating in the same direction but in paths inclined thereto, and clamp fingers carried by said chains to receive and clamp the leaves to be conveyed and delivered to said first mentioned carrier.

3. In a shredding machine preparatory to spinning, and in combination with shredding devices, and a carrier for the leaves to be shredded, of a chain located alongside the carrier, to operate therepast in a path inclined thereto, fingers pivotally mounted in said chain, a cam arranged to be engaged successively by the fingers to separate adjacent ones to receive a leaf therebetween, and means to actuate said chain and carrier.

4. In a shredding machine preparatory to spinning, and in combination with shredding devices, and a carrier for the leaves to be shredded, of chains respectively located alongside but on opposite sides of said carrier, fingers pivotally mounted in said chains, a cam arranged to be engaged successively by the fingers of each chain to separate adjacent ones, whereby a leaf may be placed between coöperating pairs of said fingers, and means to actuate said chains to deliver the leaves to said carrier.

5. In a shredding machine preparatory to spinning, and in combination with shredding devices, and a carrier for the leaves to be shredded, of a feeding apparatus to feed the leaves individually in successive order to the carrier, and including chains having pivoted fingers to initially receive individual leaves therebetween, means to separate adjacent fingers to receive the leaves, and means to actuate said chains.

6. In a shredding machine preparatory to spinning, and in combination with shredding devices, and a carrier for the leaves to be shredded, of a feeding apparatus to feed the leaves to the carrier, and including chains having pivoted fingers to initially receive the leaves therebetween, means to separate adjacent fingers to receive the leaves, means to fold the fingers upon each other to clamp the leaves therebetween, and means to actuate said chains.

7. In a shredding machine preparatory to spinning, and in combination with shredding devices, and a carrier for the leaves to be shredded, of a feeding apparatus to feed the leaves to the carrier, and including chains having pivoted fingers to initially receive the leaves therebetween, means to separate adjacent fingers to receive the leaves, means arranged in the path of the fingers to engage and fold them upon each other to clamp and hold the leaves therebetween, and means to actuate said chains to deliver the leaves to the carrier.

8. In a shredding machine preparatory to spinning, and in combination with shredding devices, and a carrier for the leaves to be shredded, of a feeding apparatus to feed the leaves to the carrier, and including chains having pivoted fingers to initially receive the leaves therebetween, said fingers normally lapping one over the other, means to separate adjacent fingers to receive the leaves, said fingers having shoulders on the rear faces thereof to engage and clamp upon the leaves, and means to actuate said chains.

9. In a shredding machine preparatory to spinning, and in combination with shredding devices, and a carrier for the leaves to be shredded, of feeding apparatus positioned at the side of said carrier and operating side by side therewith in the same direction to receive and deliver the leaves to the carrier, and transfer devices to engage the leaves and effect the transfer thereof from the feeding apparatus to the carrier.

10. In a shredding machine preparatory to spinning, and in combination with shredding devices, and a carrier for the leaves to be shredded, of a shoe positioned over the carrier, of feeding apparatus including chains having carrying fingers pivotally mounted thereon to receive the leaves individually, and means arranged in advance of the shoe to fold the fingers upon each other to clamp and hold the leaves, said chains operating to carry the leaves beneath the shoe and between the same and the carrier.

11. In a shredding machine preparatory to spinning, and in combination with shredding devices, and a carrier for the leaves to be shredded, of a shoe positioned over the carrier conveying chains having means to receive and hold the leaves and deliver the same to the carrier and beneath the shoe, and transferring devices for detaching the leaves from the chain holding means and passing the same to the carrier.

12. In a shredding machine preparatory to spinning, and in combination with shredding devices, and a carrier for the leaves to be shredded, of means positioned at the side of said carrier and operating side by side therewith in the same direction to receive and deliver the leaves to the carrier, and pin wheels operating to engage the leaves, and transfer them successively from the leaf receiving and delivering means to the carrier.

13. In a shredding machine preparatory to spinning, and in combination with shredding devices, and a carrier for the leaves to be shredded, of feeding devices positioned at the side of said carrier and operating side by side therewith in the same direction to receive and deliver the leaves to the carrier, wheels arranged at the point of delivery of the leaves, and carrying pins to impale the leaves and transfer the same from the feeding devices to the carrier in successive order.

14. In a shredding machine preparatory to spinning, and in combination with shredding devices, and a carrier for the leaves to be shredded, of feeding devices to receive and deliver the leaves to the carrier, wheels arranged at the point of delivery of the leaves and positioned over the line of feed thereof, and having pins to impale the leaves in successive order to transfer the same from the feeding devices to the carrier, and means to press the leaves into impaling relation with respect to said pins.

15. In a shredding machine preparatory to spinning, and in combination with shredding devices, and a carrier for the leaves to be shredded, of feeding devices for the leaves arranged to operate past said carrier, pin wheels arranged over the line of feed of the leaves, and rocking members located beneath the line of feed of the leaves to successively engage the leaves and press the same onto the pins of said wheels to effect the transfer of the same from the feeding devices to the carrier.

16. In a shredding machine preparatory to spinning, and in combination with shredding devices, and a carrier for the leaves to be shredded, of feeding devices for the leaves arranged to operate past said carrier, pin wheels arranged over the line of feed of the leaves, a forked member located beneath the line of feed of the leaves and arranged to straddle the path of each pin wheel, and means to periodically rock said forked members.

17. In a shredding machine preparatory to spinning, and in combination with shredding devices, and a carrier for the leaves to be shredded, of feeding devices for the leaves arranged to operate past said carrier, pin wheels arranged over the line of feed of the leaves, and rocking members located beneath the line of feed of the leaves to successively engage the leaves and press the same onto the pins of said wheels to effect the transfer of the same from the feeding devices to the carrier, and means operating in advance of the pin wheels to engage the feeding devices to clamp the same upon the leaves.

18. In a machine of the class described, a framework, a carrier, a shaft over which the carrier operates, shafts respectively located above and below the carrier shaft, a feed chain operating over said last mentioned shafts, and devices carried thereby and operating to receive leaves to be treated and to deliver the same in successive order to said carrier and means for actuating said shafts.

19. In a machine of the class described, a framework, a carrier, a shaft over which the carrier operates, shafts respectively located above and below the carrier shaft, a feed chain operating over said last mentioned shafts, means to impose a tension on one of said feed chain shafts to hold the feed chain in tension.

20. In a shredding machine preparatory to spinning, and in combination with shredding devices, and a carrier for the leaves to be shredded, of a feeding apparatus to feed the leaves to the carrier positioned at one side thereof to operate side by side in the same direction therewith, and including chains having pivoted fingers to initially receive the leaves therebetween, said fingers having enlarged bases, a cam arranged in the path of travel of said bases to engage the same and rock the fingers into position to receive the leaves therebetween.

21. In a shredding machine preparatory to spinning, and in combination with leaf feeding devices, of shredding apparatus past which the leaf feeding devices operate, and including shredding cutters located on opposite sides of the feeding devices, and bars or plates to support the leaves to be shredded against the action of the shredding cutters, said bars being slitted in their edges in the path of action of the cutters.

22. In a shredding machine preparatory to spinning, and in combination with leaf feeding devices, of shredding apparatus past which the leaf feeding devices operate, and including disks located on opposite sides of the feeding devices, cutters carried at the peripheries of said disks, and means coöperating with the cutters to hold the leaves in flattened condition during the action of the cutters.

23. In a shredding machine preparatory to spinning, and in combination with leaf feeding devices, of shredding apparatus past which the leaf feeding devices operate, and including disks located on opposite sides of the feeding devices, cutters carried at the peripheries of said disks, and fingers carried by the disks and operating to engage and hold the leaves in flattened condition during the action of their associated cutters.

24. In a shredding machine preparatory to spinning, and in combination with leaf feeding devices, of shredding apparatus past which the leaf feeding devices operate, and including disks located on opposite sides of the feeding devices, cutters carried by the peripheries of said disks, bars over which the leaves are fed, and means to hold the leaves flat upon said bars during the action of the cutters.

In testimony whereof I have hereunto set my hand in the presence of the subscribing witnesses, on this 26 day of October, A. D., 1914.

GEORGE A. LOWRY.

Witnesses:
SAMUEL E. DARBY, Jr.,
MARJORIE A. GRAEVE.

Copies of this patent may be obtained for five cents each, by addressing the "Commissioner of Patents, Washington, D. C."